United States Patent [19]

Drakenborn et al.

[11] 4,434,460
[45] Feb. 28, 1984

[54] HIERARCHICAL COMPUTER SYSTEM FOR GENERATING SELECTIVE OUTPUT SIGNALS IN RESPONSE TO RECEIVED INPUT SIGNALS

[75] Inventors: Karl-Gunnar Drakenborn, Alvsjo; Mats A. Enser, Lidingo; Kurt G. E. Grebner, Stocksund; Erik I. Wallmark, Lidingo, all of Sweden

[73] Assignee: International Business Machines Corporation, Armonk, N.Y.

[21] Appl. No.: 160,760

[22] Filed: Jun. 18, 1980

[30] Foreign Application Priority Data

Jun. 18, 1979 [SE] Sweden ............................ 79053500

[51] Int. Cl.³ .............................................. G06F 3/04
[52] U.S. Cl. .................................... 364/200; 364/900
[58] Field of Search ... 364/200 MS File, 900 MS File, 364/178, 179; 340/825.31; 235/382, 92 DP; 318/636

[56] References Cited

U.S. PATENT DOCUMENTS

| 3,219,980 | 6/1960 | Griffith | 364/200 |
|---|---|---|---|
| 3,454,936 | 7/1969 | Bridge | 364/200 |
| 3,566,090 | 2/1971 | Johnson | 364/900 |
| 3,614,745 | 10/1971 | Podvin | 364/200 |
| 3,706,077 | 12/1972 | Mori | 364/200 |
| 3,760,375 | 9/1973 | Irwin | 364/200 |
| 3,786,234 | 1/1974 | Trent et al. | 364/900 |
| 3,814,913 | 6/1974 | Ironside et al. | 364/178 |
| 3,962,685 | 6/1976 | Belle Isle | 364/200 |
| 3,976,979 | 8/1976 | Parkinson | 364/200 |
| 4,025,905 | 5/1977 | Gorgens | 364/900 |
| 4,096,566 | 6/1978 | Borie | 364/200 |
| 4,216,375 | 8/1980 | Ulch | 235/382 |
| 4,218,690 | 8/1980 | Ulch | 340/825.31 |
| 4,234,932 | 11/1980 | Gorgens | 364/900 |

FOREIGN PATENT DOCUMENTS

| 354783 | 1/1980 | Austria. |
|---|---|---|
| 2718599 | 11/1977 | Fed. Rep. of Germany. |
| 2730537 | 1/1978 | Fed. Rep. of Germany. |
| 2641741 | 3/1978 | Fed. Rep. of Germany. |
| 2831887 | 2/1979 | Fed. Rep. of Germany. |

OTHER PUBLICATIONS

D. W. Piller, Data Entry Unit System Including a Hierarchy of Microcontrollers, Aug. 1976, vol. 19, No. 3, pp. 1068 and 1069, IBM Technical Disclosure Bulletin.

*Primary Examiner*—Mark E. Nusbaum
*Assistant Examiner*—Michael R. Fleming
*Attorney, Agent, or Firm*—Karl O. Hesse

[57] ABSTRACT

Hierarchical three-level computer system for receiving input messages from signal sources (23) and for conditionally activating output devices (26) according to input messages; the system comprising a host computer (15), a terminal computer (27) and a number of micro computers (22). The central computer enters condition tables into specific storage modules (2A-2E) within the terminal computer. These tables can be displayed on the terminal computer screen (10) and may be updated from the terminal computer keyboard (8). The micro computer receives input signals from a signal source (22) and composes input messages, which are transferred to the terminal computer. The terminal computer makes a comparison between input messages and condition table data and selectively activates the output devices (26).

A specific up and down counting apparatus within the micro computer enables a simultaneous signal detection and data processing operation.

7 Claims, 3 Drawing Figures

HIERARCHICAL COMPUTER SYSTEM FOR GENERATING SELECTIVE OUTPUT SIGNALS IN RESPONSE TO RECEIVED INPUT SIGNALS

FIELD OF THE INVENTION

This invention relates to a hierarchical computer system for receiving input signals from a plurality of signal sources and for generating selective output signals in response to received input signals.

The invention further relates to a specific signal detecting system in a hierarchical terminal based computer system.

DESCRIPTION OF THE PRIOR ART

The use of a main computer, that is connected through a transmission channel or a transmission line to a smaller unit consisting of a more or less intelligent interactive terminal unit, is well known in the computer art. This terminal unit may in turn control a plurality of intelligent or non-intelligent smaller units, for instance conventional input/output devices.

Such a hierarchical computer system is described in IBM Technical Disclosure Bulletin, Vol 19, No 3, August 1976, pp 1068 and 1069, where a main computer (not shown) is connected through a transmission channel to a system control unit. The system control unit is further connected to output devices as well as to a number of micro control units, each of which controlling a number of input/output devices.

One way of using a main computer with a terminal unit for entrance control is shown in the U.S. Pat. No. 3,913,071. According to that system the terminal unit receives signals from a signal source, assembles the information about these signals and transfers them to a main computer. The main computer processes the data and thereafter signals the answer to the terminal unit, which then activates an output device, preferably a door locking mechanism.

One problem in connection with a hierarchical computer system, that receives input signals, processes these signals and as a result of the processing issues output signals to output devices, resides in the difficulty of distributing optimally the processing functions of the various computers of the system in such a way that the system user's wishes are met with and that the various computers are neither overloaded nor underloaded.

SUMMARY OF THE INVENTION

In accordance with what is stated above the present invention relates to a hierarchical three-level computer system with a host computer, a terminal computer and a number of micro computers. Each micro computer is connected to a signal source for receiving and optimal decoding of input signals. The terminal computer receives input information from the micro computers, compares this information with stored table data, which may be selectively altered from a keyboard, communicates selectively with a host computer and generates output signals to output devices.

The invention further relates to a computer system with a terminal computer, which is equipped with a plurality of displayable storage areas or modules for storing displayable tables containing condition information enabling the input information from signal sources to produce output signals to output devices.

The invention further concerns the use of an up and down counter which is loaded with a constant, within the signal receiving micro computer for signal detection and signal processing.

The invention is preferably used in such applications, where a magnetic card reader, which generates an F2F(NRZI) code, or an optical bar code reader is used as the signal source.

The advantage of the computer system according to this invention over prior art resides in the fact that full use is made of the various computers on the different levels. The use of the up and down counting apparatus within the micro computer makes it possible to save computing time, which time may be used for assembling data, error checking routines, etc. within a micro computer. The use of table memories in the terminal computer enables checking the validity of the input signals in order to create output signals at the terminal computer without the need to activate the host computer in each separate case. The invention further enables updating the table data in the terminal computer through the keyboard, which means that the terminal computer can work independently without any help from the host computer. Further the invention enables a selective reduction of the freedom for the terminal computer to influence table data, if the host computer considers this freedom not to be given to the terminal computer.

The use of adapter and connector circuits between the various computer levels enables a degree of independence for the various computer levels, which may be adapted to the area of application. This is especially advantageous if the system is used in connection with classified entrance checking.

DESCRIPTION OF THE PREFERRED EMBODIMENT

The invention will be described in detail with reference to the accompanying drawings.

Figure 1:
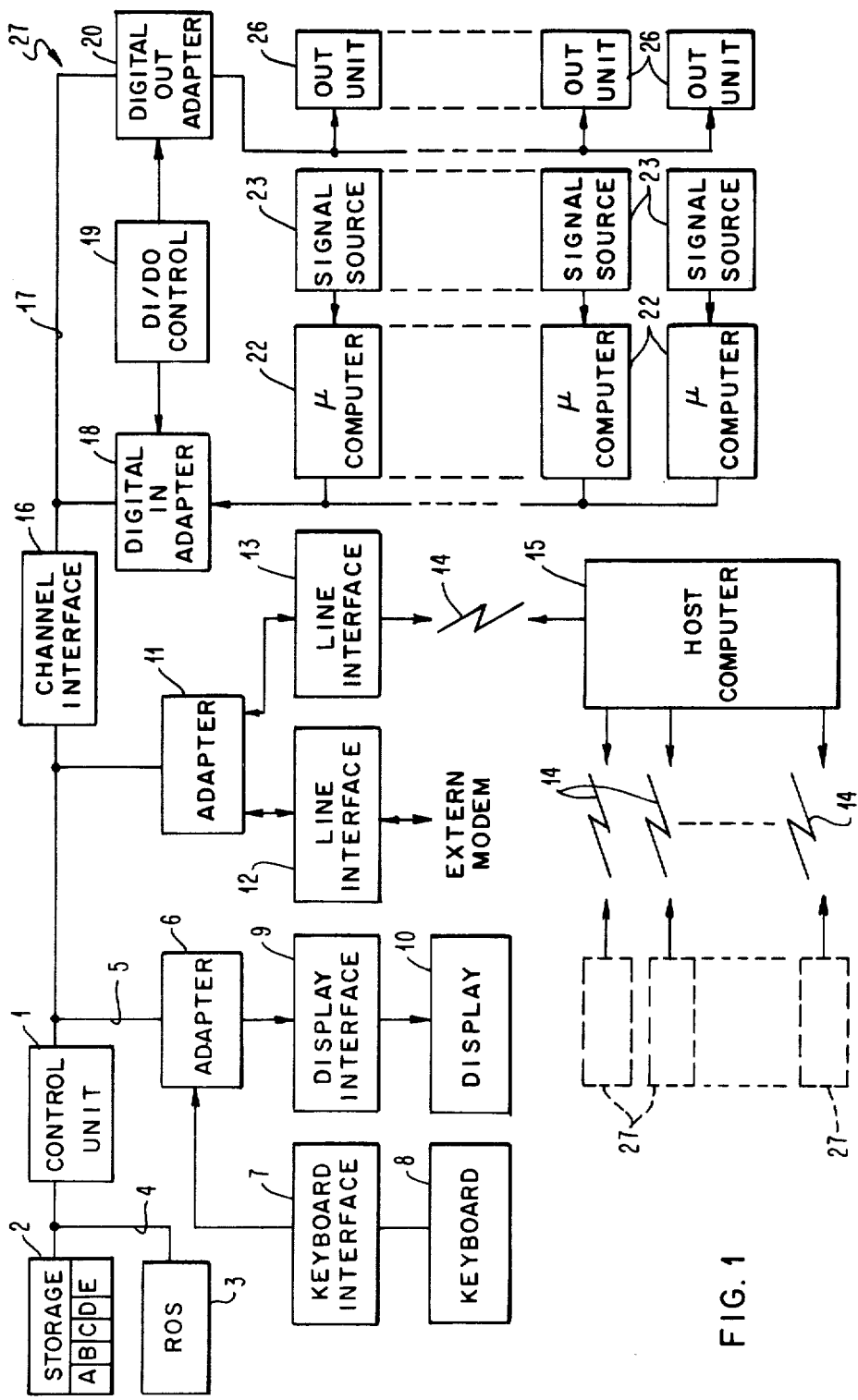
FIG. 1 is a schematic diagram of a hierarchical computer system according to the present invention.

Referring to FIG. 1, a terminal computer 27 comprises a control unit 1, which is connected through a memory channel 4 to a storage 2 and a read only memory 3 as well as through an input/output channel 5 to a plurality of input/output devices represented by a keyboard 8, a display 10, a number of micro computers 22 and a number of output devices 26. Moreover, the control unit 1 is connected through its input/output channel 5, an adapter 11, a line connection 13 and a transmission channel 14 to a host computer 15. The host computer 15 is also connected through other transmission channels 14 to other similar terminal computers 27.

The keyboard 8 is connected through a keyboard interface 7 and an adapter 6 to the input/output channel 5. Similarly the display 10 is connected through a display interface 9 and the adapter 6 to the input/output channel 5 and thus to the control unit 1. Each one of a number of signal sources 23 is connected to a micro computer 22, which through a digital in adapter 18 is connected through a digital channel 17, a channel interface 16 and the input/output channel 5 to the control unit 1. Similarly the output devices 26 are connected through a digital out adapter 20, the digital in/out channel 17, the channel interface 16 and the input/output channel 5 to the control unit 1. The control unit 1 can further communicate through the input/output channel 5, the adapter 11 and a line interface 12 with external modulators/demodulators for transmission lines.

As to the function of the system in FIG. 1 the host computer 15 initially loads control data through the transmission channel 14, the line interface 13, the adapter 11 and the control unit 1 into the control modules 2A, 2B, 2C, 2D and 2E of the storage 2. Alternatively or as a complementary function certain control data may also be loaded through the keyboard 8, the keyboard interface 7, the adapter 6 and the control unit 1 into the modules A, B, C, D and E of the storage 2.

When the terminal computer 27 has been loaded with control data it is ready to receive signals from the signal sources 23 and to influence the output devices 26 according to these signals and with regard to the stored control data. When a signal source 23 starts sending input signals to its associated micro computer 22, these input signals are detected and decoded in the micro computer and assembled to a message in the form of e.g. a number of characters. The micro computer 22 then calls the digital in adapter 18, which is controlled by a digital in/out controller 19, in order to transmit the message to the digital in adapter 18. From the digital in adapter 18 the message is transmitted through the channel interface 16 and the input/output channel 5 to the control unit 1. The control unit 1 compares the message with the stored control data in the storage modules A, B, C, D and E in order to decide whether the message is a valid message and whether this message is to cause an activation of an output device 26. If that is the case the control unit 1 sends a corresponding output message throught the in/out channel 5, the channel interface 16, the digital output adapter 20, which is as well controlled by the digital in/digital out controller 19, to a chosen output device 26 to be activated.

The system according to FIG. 1 can operate in different modes. In a first operating mode the terminal computer 27 operates substantially independently when it is once loaded from the host computer 15. The terminal operator has access to the keyboard 8 and the display 10. On the display 10 the operator can follow the influence on the system from the incoming messages from the signal sources 23 and the micro computers 22 to the control unit 1. Through the keyboard 8 the operator then may change or update the control data in the control modules A-E of the storage 2.

In the second operating mode of the system the operator cannot change the control data in the storage 2 through the keyboard 8 and the display 10. All control data changes are made from the host computer 15 through the communication channel 14. However, the operator is able to communicate with the host computer and to receive information from as well as deliver information to the host computer 15 through the control unit 1.

A third mode of operation combines the operation modes 1 and 2 in such a way that the operator is able to update certain information in the control data of storage 2.

Figure 2:
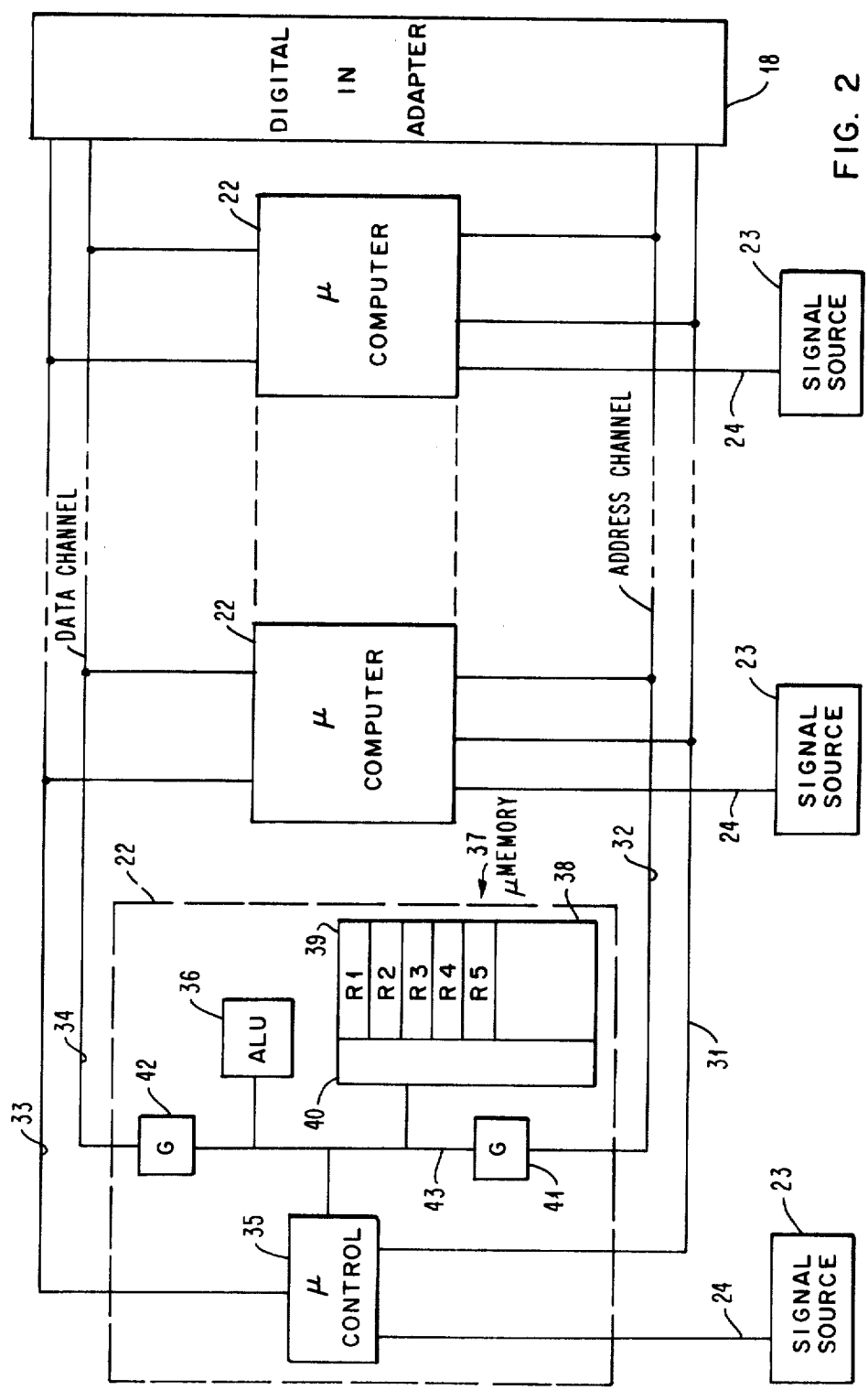
FIG. 2 discloses the constructing of the micro computers in FIG. 1.

FIG. 2 illustrates the micro computers 22 and the signal sources 23. A micro computer 22 comprises a micro control unit 35, an arithmetic logic unit 36, a micro storage 37 and a number of gates 41 and 42. An internal channel 43 interconnects the various units of the micro computer. The micro control unit 35 is further connected to the signal source 23 through a conductor 24, to the digital in adapter 18 through a conductor 33 for input signals and to the digital in adapter 18 through an output conductor 31 for output signals. The gate 42 is connected to the digital in adapter through an output data channel 34, and the gate 41 is connected to the digital in adapter 18 through an input address channel 32.

A number of micro computers 22 with associated signal source 23 can be connected in parallel with the digital in adapter through the data channel 34, the address channel 32 and the input and output control conductors 31 and 33.

The following is a description of the operation of the micro computer 22 for receiving signals from the signal source 23 as well as decoding and assembling this signal data. Reference will be made to the timing diagram of FIG. 3.

Figure 3:
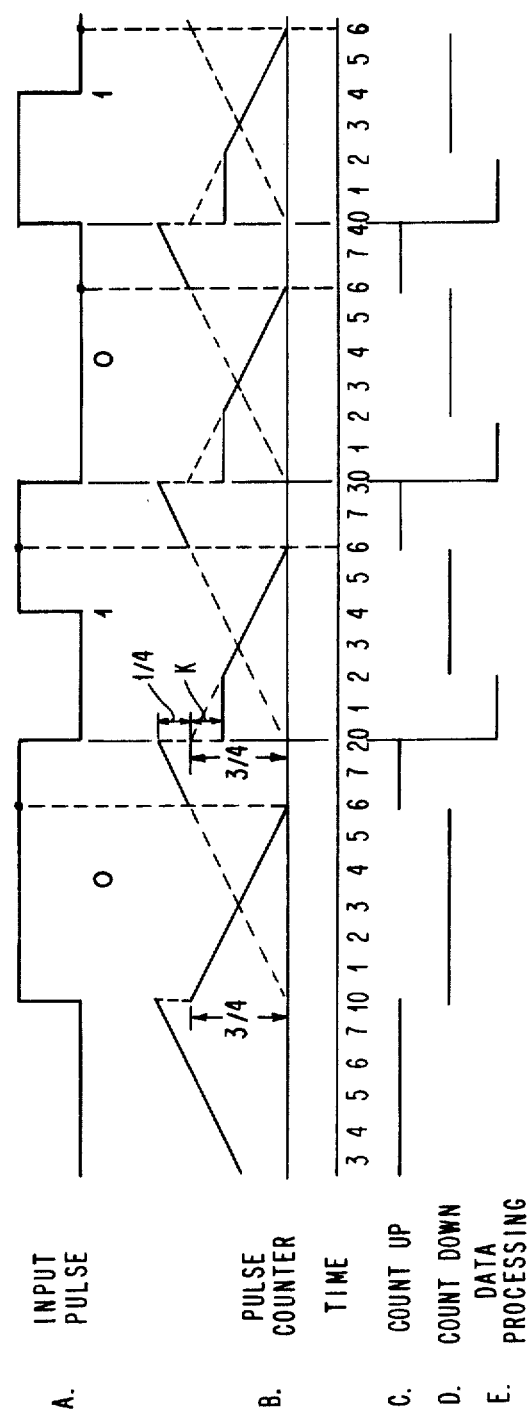
FIG. 3 is a timing diagram for the signal detection in a micro computer according to FIG. 2.

It is assumed that the signal source 23 issues signals, the form of which is shown on line A for the input pulse in FIG. 3. This signal form is called an F2F code, whereby a zero value for the signal during a time interval is represented by a constant signal level, whereas a 1 value is represented by a change in signal level during a time interval.

The micro memory 37 of the micro computer 22 comprises three main parts: a decoder 40, a data storage 38 and a register storage 39.

With reference to FIG. 3 the input pulse changes its level from a low value to a high value at time 10 on the time line T. The micro control unit 35 recognizes this level change which occurs on the conductor 24 from the signal source 23.

The operations start one time interval earlier at time T=0 (not shown) when a pulse counter within the micro computer 22 starts counting up from the value 0. In FIG. 3 this pulse counter is shown on line B. At time T=10 this pulse counter has reached a maximum value. Within the micro computer 22 this pulse counter is represented by a register R1 in the register storage 39 according to FIG. 2. The contents of the register R1 will be counted up continuously through the arithmetic logic unit 36 in a conventional way. At time T=10, the pulse counter having reached its maximum value, the arithmetic logic unit 36 calculates a ¾ value of the pulse counter's maximum value. This ¾ value is stored in another register, e.g. R2 within the register storage 39. At the same time this ¾ value is also stored in the pulse counter R1. From this time 10 on the pulse counter R1 starts counting down. At time T=16 the pulse counter reaches the value zero. This time is used for detecting the signal level of the input signals. From FIG. 3 it is seen that the input signal has a high value at time T16. This high value is stored in one more register, e.g. register R3 within the register storage 39. At time T16 also the contents of register R2 is returned to the register R1. Now the pulse counter R1 has again a ¾ value of its maximum value. From this time on, the pulse counter R1 starts counting up again until a level change occurs in the input pulse, which will take place at time T20. At this time the ¾ value of the contents of the pulse counter R1 will again be calculated in the arithmetic logic unit 36. The new ¾ value is stored in the register R2. From this ¾ value one more constant K is subtracted, and the result is stored in R1. The constant K corresponds to a given counting down time for the pulse counter R1; according to FIG. 3 the constant K corresponds to two time units. This means that the pulse counter R1 does not have to start its counting down at time T20 but at time T22. During the time interval between T20 and T22 the micro computer can execute other tasks. In other words it may process data, which is shown on line E in FIG. 3. At time T22 the pulse counter R1 starts counting down from a value which is ¾ of the maximum value reduced by K.

According to FIG. 3 the input pulse changes its level from a low value to a high value at time 24. At time 26 the pulse counter R1 reaches the value zero. At this time a higher value is detected for the input pulse. The micro control unit 35 now initiates a comparison in the arithmetic logic unit 36 between the earlier stored input pulse value from register R3 and the current input pulse value. When the values are equal, the current input pulse has a value of 1. FIG. 3 shows that the input pulse during the time interval between T20 and T30 has the value 1. At time T26 the pulse counter R1 is reloaded with the ¾ value from the register R2, whereafter the pulse counter R1 starts counting up.

At time T30 the input pulse changes its level from high to low. The pulse counter R1 then stops at its maximum value, at which time a new ¾ value is calculated and the constant K subtracted. Between time T30 and T32 data is processed according to line E in FIG. 3. From time T32 on, pulse counter R1 starts counting down, which is illustrated on line D in FIG. 3. At time T36 the pulse counter R1 reaches zero level, at which time the input pulse level is detected. In this case the input pulse has a low value. The earlier detected input pulse level, which has been stored in R3, is compared to the current level in arithmetic logic unit 36. In this case the levels are not equal, which means that the detected input signal has the value zero. It is seen in FIG. 3 that the input signal has the value zero during the time interval T30 to T40. At time T36 the value for the latest input pulse level is reloaded in the register R3, that is the value of a low input pulse signal. At time T36 the input pulse counter R1 is also loaded with the ¾ value from the pulse counter R1 is also loaded with the ¾ value from the register R2, whereafter the pulse counter R1 starts counting up. This is shown on line C in FIG. 3. At time T40 the input pulse changes its level, the pulse counter stops and the ¾ value is calculated and transferred to the register R2. The constant K is subtracted and the result is stored in R1. The data processing occurs during the time interval T40 to T42 according to line E, whereafter the pulse counter counts down according to line D and a new level detection is carried out at time T46.

In this way the micro computer 22 is able to continuously detect the input pulses from the signal source 23. It should be noted that the counter value ¾ of the maximum value has been chosen in order to have the probability of this signal level detection as high as possible when using the F2F code. This is clearly shown at time 26 in FIG. 3.

It should further be noted that, if the time interval between level changes for the input pulse increases or decreases, then the detection point follows this change due to the fact that the detection point is calculated starting from the ¾-value for the total value of the pulse counter. However, the computing time of the micro computer will always be the same owing to the constant K.

According to FIG. 3, line E represents the time available for data computing within the micro computer. During this time period the micro computer assembles input data from the signal source 23, calls the digital in adapter 18, receives signals from digital in adapter 18 and transmits data on data channel 34 to the adapter.

A specific embodiment of the invention in the form of a system for attendance and entrance control will now be described.

The system comprises a number of magnetic card readers arranged at convenient places within a building in order to register the attendance time for the employees working in the building and to allow selective entrance to certain people through certain watched doors. Each individual then has a personal identity card in the form of a magnetic card, which he puts into the magnetic card reader when passing this reader. The magnetic card reader reads the identity number on the card, whereafter the system records the entrance time and the identity number and possibly opens a corresponding entrance door. The input of a magnetic card may further light a signal lamp.

In connection with such a system for attendance and entrance control a number of different alternatives are possible. It may for instance be desirable that certain magnetic cards can only be used when checking the attendance, while other magnetic cards may be used for getting entrance to locked areas. It can further be desirable that the entrance to locked areas is divided into selective classes, that the system has certain routines regarding lost magnetic cards and that the possibility exists to detect invalid cards and so on. In order to meet these requirements the system is built according to what is called a classification checking system.

The above mentioned classification adapted system works in such a way that according to FIG. 1 the host computer 15 first of all sends a number of tables to the storage 2 of the terminal unit 27. The very first table, consisting of a magnetic card class table, is stored in what is called a storage module 2A within the memory 2. An example of such a class table is shown below (table 1).

TABLE 1

| signal source | 1 | 2 | 3 | 4 | 5 | 6 | 7 | 8 |
|---|---|---|---|---|---|---|---|---|
| class | 0 | 1 | 2 | 3 | 2 | 4 | 10 | 7 |
| output device | 1 | 4 | 5 | 6 | 7 | 8 | 0 | 3 |
| output time | 10 | 15 | 15 | 30 | 20 | 2 |  | 15 |
| message host computer | 0 | 1 | 1 | 3 | 3 | 3 | 2 | 2 |
| message terminal | 0 | 2 | 3 | 2 | 1 | 1 | 3 | 3 |

The first line of this table indicates the signal source number, that is the number of the magnetic card reader. It is supposed that there are eight magnetic card readers which in FIG. 1 are represented by the signal sources 23. The second line shows the class number. According to the example above all available magnetic cards are divided into ten classes. Which cards belonging to which classes is indicated in table 2 that will be explained later on.

The third line indicates the sequence number of the output device. Accordingly it can be seen that the first signal source or the first magnetic card reader acts upon the first output device. It can further be seen that the fourth signal source acts upon the sixth output device. This action may be the opening of a door, the lighting of a lamp or the closing of a contact.

The fourth line tells us for how long time (seconds) the output device is acted upon. Accordingly it can be seen, for instance, that the third signal source is acting upon the output device 5 during 15 seconds.

The fifth line gives the condition for the sending of a message to the host computer, and the sixth line gives the corresponding conditions for showing the message on the terminal display. The message lines 5 and 6 are divided into four error classes. Error class 0 means: when a magnetic card is inserted into a magnetic card reader, that is into a signal source, nothing is to be reported even if an error occurs. If the error class has the value of 1 only such errors are reported that indicate the use of a card which earlier has been reported to be lost. Error class 2 means that both lost cards and invalid cards are reported, error class 3 means that all error cards are reported, i.e. also errors due to the use of a card outside the card class that according to line 2 of table 1 is allowed for the corresponding magnetic card reader.

When the host computer 15 during an initiating phase state is loading the table 1 into the storage module 2A, the host computer will further transmit other table screens to the storage modules 2B, 2C, 2D and 2E. These table screens comprise a card class index table in the form of a table 2, which is stored in the storage module 2B. The third table consists of a specific card class table and is stored in the storage module 2C. The fourth table consists of a message report to the host computer and is stored in the screen storage 2D. The fifth table consists of error messages for the terminal and is stored in the storage module 2E.

The tables 1-5 are transferred from the host computer to the terminal displayable storage areas 2A-2E in such a form that their information is easily available to an operator working at the terminal keyboard 8 and its display 10. This means that the table fields are equipped with what is known in the art as attribute characters, which define the position of a field on the display. Accordingly it is easy for an operator to get access through the cursor of the keyboard and the display to any position or any field whatsoever within a table. Such tables are also called screens and are very easy to use for the operator.

One example of a card class index table is shown in table 2 below.

TABLE 2

| S2 | . | CL00 00000–15000 | CL06 10110–10150 |
|---|---|---|---|
|  |  | CL01 10000–10100 | CL07 10200–10300 |
|  |  | CL02 10000–10500 | CL08 11000–11500 |
|  |  | CL03 10500–10999 | CL09 12101–12200 |
|  |  | CL04 12000–12600 | CL10 12000–15000 |
|  |  | CL05 13000–13999 |  |

In this example it is supposed that the total number of magnetic cards are 15000. The card class zero comprises all these cards. The card class one comprises only one hundred cards, i.e. all magnetic cards between the values of 10000-10100. The card class two comprises 500 cards, defined by the card numbers between 10000 and 10500 and so on for the remaining card classes.

Going back to table 1 it can be seen that for instance the signal source number eight, i.e. the magnetic card reader number eight, accepts only the card class seven, i.e. magnetic cards with identity number between 10000 and 10300, as valid cards. If such a card is put into the signal source number eight, the output device number three is acted upon during 15 seconds. If a card outside class seven is put into the signal source number eight, this will be reported as an error to the terminal display due to the error code 3. However, this error is not reported to the host computer owing to the error code 2 on line 5 of the table 1. If, however, a card that is invalid or a card that has been reported 'lost' would be put into the signal source 8, this fact too would be reported to the host computer.

The third table is stored in the storage module 2C and is a listing of all valid magnetic cards grouped according to card class. To start with all cards are considered invalid, but, depending on which system is used, the host computer or the terminal operator may give validity to the various cards. In such a way a validity table 3 can be set. Below is an example of table 3 for card class 4.

TABLE 3

| S3 | 04 | 12345-A | 12346-B | 12350-C | 12368-B |
|---|---|---|---|---|---|
|  |  | 12370-B | 12375-B | 12376-B | 12379-A |
|  |  | 12390-B | 12392-B | 12394-B | 12396-B |
|  |  | 12398-A | 12400-A | 12405-A | 12410-C |
|  |  | 12420-A | 12430-A | 12440-B | 12450-B |
|  |  | 12500-A | 12510-A | 12520-A | 12600-B |

According to table 2 it is seen that card class 4 comprises cards with identity numbers 12000 and 12600, corresponding to the numbers in table 2.

Each card number in the above table 3 has been given a further note A, B or C. The letter A means a valid card, the input of which into a magnetic card reader always is to be recorded. The letter B means a card which is not to be recorded, and the letter C means a card which has been reported 'lost'. It is also possible to use the letter D for invalid cards. Accordingly an identity number for a card in table 3 can be changed into invalid by attaching the letter D instead of an earlier letter A-C.

The fourth table is a listing of error messages for the main computer. An example of table 4 is shown below.

TABLE 4

| S4 | Message 1 | Message 7 |
|---|---|---|
|  | Message 2 | Message 8 |
|  | Message 3 | Message 9 |
|  | Message 4 |  |
|  | Message 5 |  |
|  | Message 6 |  |

A message in the above table consists of five characters for the identity card number, four characters for the time in hours and minutes and one character for indicating the error time. Going back to table 1 it can be seen that for instance for signal source number one no message will ever be input into table 4 due to the fact that the message to the main computer has the error code number 0. It can further be seen that from the signal source 2 an erroneous message can only be input into table 4 if somebody has tried to use a magnetic card which has been reported as a lost card. From the signal source 4, however, all erroneous inputs of magnetic cards are reported to the table 4.

Table 5 is an error table regarding messages to the terminal.

TABLE 5

| S5 | Error 1 | Error 6 |
|---|---|---|
|  | Error 2 | Error 7 |
|  | Error 3 | Error 8 |
|  | Error 4 | Error 9 |
|  | Error 5 | Error 10 |

The error message has the same form as the messages of table 4. Thus, a message in table 5 comprises notes about identity number, time and type of error. Besides the error types mentioned in accordance with table 4, table 5 may also include further error types, i.e. the host computer has not loaded correct tables into the storage modules 2A–2E, if the message table 4 or the error table 5 is full and so on.

When the system is used for attendance control it is necessary that a time indication will be recorded in connection with the input of a magnetic card into a magnetic card reader. This time indication is generated in such a way that the host computer in connection with the loading of the screen tables also sends an initial time indication to the terminal 27. Thereafter this initial time is updated every second from a day time clock in the terminal, which delivers an impulse every second. This time clock is conveniently provided in the storage 2 of the terminal 27.

According to FIG. 1 the generation of input signals to output devices 26, depending upon input signals from signal sources 23, will now be described.

The operation starts when a person passing a magnetic card reader puts his magnetic card into the reader. According to FIG. 2 this means that a magnetic card is inserted into a signal source 23. The signal source then starts sending signals to the micro control unit 35 of the micro computer 22 over the line 24 as described previously. This signal transmission results in zeroes and ones being recorded in the micro computer as described in connection with FIG. 3 and FIG. 2. The zeroes and ones that have been read are preferably loaded into a register R4 within the register storage 39. At this time the micro computer 22 also reads and records start characters, end characters, checks the parity and so on. This means that the micro computer 22 independently reads a message from a magnetic card and checks its signal validity. All this data computing takes place during the time indicated on line E in FIG. 3 for data computing.

It should be noted that the assembling of input data from a read magnetic card in a signal source 23 is handled completely within the micro computer 22 before the terminal 27 is called through digital in adapter 18. This means that if an error occurs when a magnetic card is read, the terminal 27 will not be called. Instead the micro computer 22 neglects such an erronous reading of a magnetic card. The individual then has to try once again to put his magnetic card into the magnetic card reader, which may lead to the recording in the micro computer 22 of a valid reading.

When the micro computer 22 records a valid reading of the contents of a magnetic card from a signal source 23, it calls the terminal 27 through the line 33 to the digital in adapter 18. The terminal 27 answers by initiating, through digital in adapter 18, a service out signal on line 31 as well as starting an address search on the address channel 32. When the digital in adapter 18 finds the called micro computer 22 through the addressing on the address channel 32, the selected micro computer 22 signals through the signal line 33 that the correct micro computer 22 has been found.

The micro computer 22 then transfers the message read from the magnetic card, which message has been temporarily stored in the micro memory 37, through the output gate 42 and the data channel 34 to the digital in adapter 18. In FIG. 1 it is seen that the message is further transferred from the digital in adapter 18 through the channel 17 and the channel interface 16 as well as through the input/output channel 5 to the control unit 1. In the control unit 1 the input message is compared with the information of table 1, 2 and 3 within the storage modules 2A, 2B and 2C. It is supposed that the message comes from a signal source number 6 and has an identity card value of 12370. From table 2 it is seen that the value of this identity card belongs to the class number 4. From table 3 it is seen that this identity card is a B-card, which means that it is valid and that the time is to be recorded. From table 1 it is seen that the signal source 6 accepts the action on the output device 8 under the condition that the identity card belongs to class 4. This is in accordance with the identity card number 12370. Accordingly, the control unit 1 issues a signal through the channel interface 16 and the channel 17 as well as the digital out adapter 20 to the output device 26 that is represented by the output device 8. The activation of output device 8 may represent the opening of a locked door or the lighting of a signal lamp. The identity number 12370 of the magnetic card and the time of its input into the signal source 23 are further stored by the control unit 1 in a further table, a result table within the storage 2.

If, however, a magnetic card having the identity number 12371 had been inserted into the magnetic card reader corresponding to the signal source 6, the terminal 27 would not have accepted this card as a valid magnetic card, due to the fact that the table 3 does not contain the identity card number 12371. The control unit 1 then feeds this message having identity card number 12371 into the error table 5. At the same time a buzzing sound reaches the operator from the control unit 1 through the keyboard 8 indicating that an error has been recorded. The operator then calls the table 5 by the keyboard 8, and that table then appears on the display 10. If no earlier errors have occurred, only the error number 1 of table number 5 has shown up. Now the operator can correct the error either through inputting the identity number 12371 as a valid number to the table 3, if the operator is authorized to do that, or he may make an inquiry to the host computer.

Then suppose that a magnetic card having the identity card value 12350 thereafter is inserted into the magnetic card reader 6. This card is read in the same way as earlier, and the message is transmitted to the control device 1. From table 3 it is seen that identity number 12350 has a character C and is classified as a 'lost' card. This means that an individual is trying to use a lost card with the magnetic card reader number 6. This is not allowed according to the system, and an error code of error class 3 is to be recorded. From the table 1 it is seen that regarding the signal source 6 an error code 3 should be reported to the host computer as well as to the terminal display. This error message is sent as the message number 1 to the table 4 within the storage module 2D and as error number 2 to the error table 5 within the storage module 2E. Thereafter the control unit 1 signals, in the same way as earlier, an error through the keyboard 8 to the operator of the terminal 27. Then the operator calls table 5 through the keyboard 8 to be displayed on the screen 10. Provided that the earlier error has not been corrected by the operator or the host computer, then two errors will be displayed on the screen 10, that is error 1 regarding the identity card 12371 and error 2 regarding the identity card 12350. The operator is then able to take appropriate steps.

While the system is working according to the above specification, result messages are continually recorded in the result table within the storage 2 as well as error messages in the screen table 2D for a host computer and in 2E for the terminal. At appropriate times these tables may be transferred to the host computer 15 for updating or computing.

According to what has been stated above a hierarchical computer system has been described, where a first computer 22 is working on a base level in order to assemble input data, an intermediate computer 27 is working on an intermediate level in order to compute data and possibly completely independently control output units in conformity to input data from the first computer, and a host computer 15 is selectively supervising the whole system on an upper level.

It is thus seen that the system according to the invention may be used for other purposes than attendance and entrance control. The signal sources 23 of FIG. 1, for instance, may consist of optical readers that read an optical bar code. Such a bar code may consist of marks that are printed on pieces of material passing the optical signal source. Then the system is able to record the passing pieces of material and take measures according to the classification on which the tables within the displayable storage modules 2A-2E are based.

It is to be noted that an important part of the invention concept resides in the possibility to control the independent operation of the computers on the different levels.

According to what is stated above the specific use of an up/down-counter with a fixed available time for data computing makes it possible for the micro computer 22 to work more or less independently. If one embodiment requires that the independence of the micro computer is extremely reduced, it is possible to send every detected input signal bit direct to the terminal computer 27. If, however, a very high degree of independence for the micro computer is desired, it is possible to store some simple condition data in the micro memory 37 instead of storing it in the storage modules 2A-2C of the terminal 27. The micro computer may then partly direct control output devices 26.

In the same way the terminal computer 27 may operate on an extremely low independence level, if part of the condition tables are stored in the host computer 15 and no changes are allowed from the keyboard 8. On a level of extremely high independence all condition tables of the storage modules 2A-2E may be updated and partly initiated from the keyboard 8. Then the host computer 15 has a mainly statistical purpose.

What is claimed is:

1. A computer system wherein a microcomputer comprising an arithmetic unit and a plurality of registers is connected to a signal source and a computer, said microcomputer is programmed for decoding an input signal from said signal source composing the decoded signal into an message, and transmitting the message to said computer, the improvement comprising:
   said microcomputer comprising means for detecting the change in level of the input signal;
   said microcomputer comprising means for decrementing which is operatively connected to a first of said registers and responsive to said detecting means, wherein said decrementing means decrements the contents of said first register from a first predetermined value commencing n+1 clock cycles after the input signal changes level, whereby n clock cycles are available to the microcomputer to compose said message;
   said microcomputer unit further comprising a means for loading said first register with a second predetermined value from a second of said registers when said first register means reaches zero, a means responsive to the detection means for incrementing said first register, said second predetermined value is incremented until the input signal again changes level, and means responsive to the detection means to generate a new first predetermined value and a new second predetermined value from the final incremented value in said first register.

2. The computer system of claim 1 wherein said second predetermined value is generated by said generating means to be substantially three-fourths of the count in said first register at the time when said input signal level changes;
   and wherein said first predetermined value is generated by said generating means to be equal to said second predetermined value minus a constant value K.

3. The computer system according to claim 2 wherein said constant value K is the value by which the first register would be decremented in said n clock cycles whereby said n clock cycles are made available for composing said message from said signal information before said decrementing means commences decrementing said first register.

4. The computer system of claim 3 wherein said computer is a terminal unit which is connected to each of a plurality of micro computers and includes storage tables having information to be compared by a program in said terminal unit with said signal information in said message from a micro computer, each of said tables being displayable to an operator of said terminal unit;
   a plurality of output devices connected to said terminal unit, an output being responsive to a favorable comparison of said signal information from a related signal source, with an item of information in said storage tables.

5. The computer system of claim 4 wherein said storage tables further comprise:
   a first displayable storage module storing a table defining the class of each signal source;
   a second displayable storage module storing a class index table defining the class of an incoming message;
   a third displayable memory module storing a validity table defining the validity of an incoming message;
   a fourth displayable storage module storing a host error message table for receiving error messages to be transferred to the central computer;
   and a fifth displayable storage module storing a terminal error message table for receiving messages to be processed in the terminal.

6. The computer system of claim 2 wherein said signal source comprises a magnetic card reader and said output device comprises a door lock.

7. The computer system of claim 6 wherein the storage modules store tables for comparison with employee number input signals.

* * * * *